United States Patent [19] [11] Patent Number: 4,761,109
Mellgren [45] Date of Patent: Aug. 2, 1988

[54] FORWARDER

[75] Inventor: Per-Gustaf Mellgren, Pointe Claire, Canada

[73] Assignee: Forest Engineering Research Institute of Canada, Pointe Claire, Canada

[21] Appl. No.: 933,863

[22] Filed: Nov. 24, 1986

Related U.S. Application Data

[63] Continuation-in-part of Ser. No. 675,182, Nov. 27, 1984, Pat. No. 4,639,186.

[30] Foreign Application Priority Data

Dec. 12, 1983 [CA] Canada .................................. 443121

[51] Int. Cl.$^4$ ............................................. B65G 67/02
[52] U.S. Cl. .................................... 414/555; 180/327
[58] Field of Search ................. 414/23, 546, 547, 549, 414/552, 553, 555, 729, 732, 733, 734, 738, 739, 740, 741, 745, 2 Z; 180/327, 242

[56] References Cited

U.S. PATENT DOCUMENTS

| 2,831,544 | 4/1958 | Dunn et al. | 180/326 X |
| 3,452,887 | 7/1969 | Larson et al. | 414/555 X |
| 3,452,888 | 7/1969 | Larson et al. | 414/555 X |
| 4,210,219 | 7/1980 | Oswald et al. | 414/734 X |
| 4,470,475 | 9/1984 | Carlson | 180/6.48 |
| 4,519,465 | 5/1985 | Triplett | 180/6.48 |

Primary Examiner—Frank E. Werner
Attorney, Agent, or Firm—Charles E. Brown; Charles A. Brown

[57] ABSTRACT

A vehicle for use in transporting goods having a specific wheel mounting arrangement on the chassis. A first wheel carrying beam is provided on one side of the chassis, fixed to the chassis and carrying a wheel at each end. A second wheel carrying beam is provided on the other side of the chassis, pivotably mounted at about its center to the chassis and carrying a wheel at each end. Thus the vehicle is provided with a fixed wheel mounting on one side and a bogie wheel mounting on the other side.

8 Claims, 4 Drawing Sheets

FORWARDER

CROSS-REFERENCE TO RELATED APPLICATIONS

The application is Continuation-in-part of U.S. application Ser. No. 675,182, filed Nov. 27, 1984, now U.S. Pat. No. 4,639,186, issued on Jan. 27, 1987.

BACKGROUND OF THE INVENTION

1. Field of the Invention

This invention is directed toward an off-road vehicle for transporting goods.

The invention is more particularly directed toward a simple off-road vehicle for loading and transporting elongated articles, particularly trees.

2. Description of the Prior Art

Vehicles for transporting trees are well known. The most commonly used vehicles, known as skidders, have means at their rear end for grabbing and lifting a bundle of trees by their butt end. The skidders then drag the bundle of trees from one location to another for further processing. The known skidders normally have four wheels, each of which can be independently mounted on the chassis of the skidder. The known skidder is thus quite stable even when travelling over rough generally level ground and is very manoeuverable. In addition, the known skidders are quite simple in construction and easy to operate thus making them inexpensive and reliable.

However, the known skidders have disadvantages. In a conventional choke skidder, the loading and unloading of the trees from the skidder takes a relatively long time, compared to the time required to transport the trees. The loading and unloading time can comprise 80 to 85% of the total loading, transport and unloading time. A conventional grapple skidder can load and unload much quicker than a choker skidder. However, the conventional grapple skidder has very poor load distribution because the load is carried well behind the rear axle of the skidder. As a result, the grapple skidder is quite unstable, particularly when working on slopes where it is liable to jack-knife. To provide more stability, the payload is often reduced. The known skidders usually drag the trees by their butt ends. However in dragging the trees, the trees become dirty and the dirt can cause damage or excessive wear on equipment used in subsequent tree processing operations. In handling trees, particularly smaller trees, by their butt ends, one or more trees are frequently dropped when dragging a bundle of the trees from one location to another. Extra time must be spent in recovering these dropped trees. At the collection location, the transported trees are piled together for further processing. However the known skidders cannot easily travel on high piles of trees to add their loads of trees to the pile so that the height of the piles is limited and more storage space is needed. When the skidders do travel on lower piles of trees, they can only move forward on the pile starting from the top end while transporting a tree bundle. Thus the height of the pile is further limited to that height which allows the skidders to safely move off the butt end of the pile. If a higher pile of trees is desired, the front blade of the skidder is used to bulldoze and push the unloaded trees into a higher pile. However this adds another step to the tree processing operation which increases the cost since the added step is time consuming. In addition, this added step is hard on the skidder leading to more frequent maintenance. With the known skidders it is also difficult to bunch the trees at the felling site into a load, since the trees normally can only be pulled into position. Often there is not enough room at the felling site to allow the skidder room to manoeuvre to pull the felled trees into a suitable load, and other means must be employed to bunch the trees.

Vehicles for transporting goods, such as trees, over rough ground employ various types of wheel mountings. Smaller, four wheel vehicles have each wheel simply, rigidly connected to the chassis. This however results in a rough ride, unequal wheel loading, and limited use in rough terrain. Other four wheel vehicles have each wheel movably, independently mounted on the chassis. This arrangement provides a smoother ride and more equal wheel loading permitting use in rough terrain. However independent, movable wheel mountings are expensive. Vehicles with six or more wheels often have two or more wheels on each side paired and mounted on the ends of a walking or pivoted beam to provide a bogie mounting. The bogie mounting of each pair of wheels, on each side of the vehicle, makes the vehicle suited for travel over rough ground in a simple manner. However bogie mountings are only used on vehicles with six or more wheels in order to provide the necessary stability.

SUMMARY OF THE INVENTION

It is the purpose of the present invention to provide a tree transport vehicle which retains many of the advantages of conventional skidders while eliminating, or at least minimizing, many of their disadvantages. More particularly, it it the purpose of the present invention to provide a tree transport vehicle which can quickly load and unload trees and which is quite stable yet quite manoeuverable under all operating conditions. It is another purpose of the present invention to provide a tree transport vehicle which can easily collect trees at the felling site into a suitable load; which can easily and safely carry the load at or near the center of gravity of the load and transport the load over rough, and even steep terrain, without damaging the trees; and which can easily unload the trees at a collecting location in a high pile.

It is another purpose of the present invention to provide a four wheel transport vehicle having an improved yet simple wheel mounting arrangement that gives a relatively smooth ride and a more uniform wheel loading thereby permitting use of the vehicle over relatively rough terrain.

In accordance with this invention there is provided a tree transport vehicle having wheels on each side of a chassis. An operator's station or cab, and the vehicle's power supply means are mounted to the chassis and located to one side of the vehicle over the wheels on that side of the vehicle. A grapple is mounted on the chassis by at least one support member at about the longitudinal center of the vehicle. The grapple is movable sideways of the vehicle by the support member between a first tree loading position on the ground adjacent the other side of the vehicle, and a second tree carrying position just over the chassis adjacent the operator's cab. The support member is shaped to have the grapple located at least partly within the support member with the grapple in its second position.

The grapple picks up a bundle of trees adjacent the other side of the vehicle at about its approximate center of gravity while the grapple is in the first position. The vehicle is easily moved relative to the bundle of trees to position it generally parallel to the bundle, and to locate the grapple in the proper position to pick up the bundle at about its center of gravity. When the bundle is picked up, the grapple is then moved sideways, relative to the vehicle, to its second carrying position lifting the tree bundle over the wheels on the vehicle's other side to overlie the vehicle chassis between the wheels. In the carrying position of the grapple, the shaped support arm allows the bundle of trees to lie closely adjacent to the top of the chassis and adjacent to the operator's station. In this position, the center of gravity of the tree bundle closely overlies the center of gravity of the vehicle, and is quite low, making the loaded vehicle quite stable, even on steep slopes. The tree bundle, extending past both ends of the vehicle, makes the vehicle very stable longitudinally. The tree bundle is easily carried from one location to another with a minimum of damage and dirt pick-up.

The side loading vehicle can quickly and easily collect individual trees at the felling site to form a bundle. The vehicle easily turns since the wheels are provided with traction steering, and the vehicle can move both forwardly and rearwardly to position the grapple. At the tree collection site, the loaded vehicle can easily climb a pile of trees, starting from their top ends, to side unload its bundle on the top of the pile and then back off the pile back toward the top end. Thus a higher pile of trees can be formed at the collection site. Both the loading and unloading of the trees is quickly accomplished through the use of the grapple, and the manoeuverability of the vehicle.

In accordance with the present invention, the tree transport vehicle is also preferably provided with a wheel mounting arrangement that is simplified, and which lowers the center of gravity of the vehicle making it more stable without greatly reducing its mobility. The two wheels on the one side of the vehicle, the side on which the operator's cab and the power supply means are located, are mounted on the chassis of the vehicle by a beam fixed to the chassis whereas the two wheels on the other side of the vehicle are mounted at the ends of a beam pivotally mounted on the chassis. Thus a bogie-type wheel mounting is provided on the loading side of the vehicle to keep all the wheels on the loading side on the ground with good load distribution independent of obstacles. The non-bogie mounting on the operator's side of the vehicle allows the operator's cab and the vehicle power supply means to be located lower to the ground. This makes the vehicle more stable. In addition, the suspension of the vehicle is simplified. The operator can drive the vehicle to have the wheels on his side steered around obstacles to partially compensate for not having these wheels bogie mounted in order to obtain a good ride.

While the wheel mounting arrangement has been described in connection with a specific tree transport vehicle, the specific wheel mounting arrangement can be used with any goods transporting four-wheeled vehicle. The pivoted beam need not be on the loading side of the vehicle nor does the fixed beam have to be on a specific side of the vehicle in relation to the operator's cab or the vehicle's power supply means.

The two wheels of the vehicle on each side can have a single hydrostatic drive for more manoeuverability. The hydraulic system needed to handle the trees is quite simple. A single fluid operator is needed to open and close the grapple, and no more than two fluid operators are needed to position the grapple.

With the operator's cab on one side of the vehicle, and the grapple in a loading position adjacent the ground alongside the other side of the vehicle, it can be difficult for the operator to see well enough to always grasp a full tree bundle. In accordance with another embodiment of the present invention, a vehicle is provided for transporting trees which vehicle has an operator's cab movable to a position where the loading can be better observed. Once loading is completed, the operator's cab is moved out of the way to make room for the loaded trees on the vehicle. The movement of the operator's cab can be synchronized with the movement of the grapple handling the trees if desired.

The invention is particularly directed toward a vehicle for loading and transporting elongated articles having a chassis with first ground engaging and drive means on one side of the chassis, and second ground engaging and drive means on the other side of the chassis. An operator's cab and power supply means for the vehicle are mounted to the chassis and overlie the first ground engaging and drive means. The vehicle has a grapple and means for mounting the grapple on the chasis at about the longitudinal center of the vehicle. Means are provided for moving the grapple mounting means to move the grapple sideways of the vehicle between a first article loading position adjacent the ground alongside the other side of the chassis, and a second article carrying position overlying and adjacent the chassis between the first and second ground engaging and drive means.

The invention is also particularly directed toward a vehicle having a chassis and a first pair of ground engaging means on one side of the chassis. A second pair of ground engaging means is provided on the other side of the chassis. A first beam carrying the first pair of ground engaging means, one ground engaging means at each end, is fixed to the chassis. A second beam carrying the second pair of ground engaging means, one ground engaging means at each end, is pivotally mounted intermediate its ends to the chassis.

BRIEF DESCRIPTION OF THE DRAWINGS

FIG. 5 is a detail view in partial cross-section showing the grapple mounting means connected to the chassis.

DESCRIPTION OF THE PREFERRED EMBODIMENTS

Figure 1:
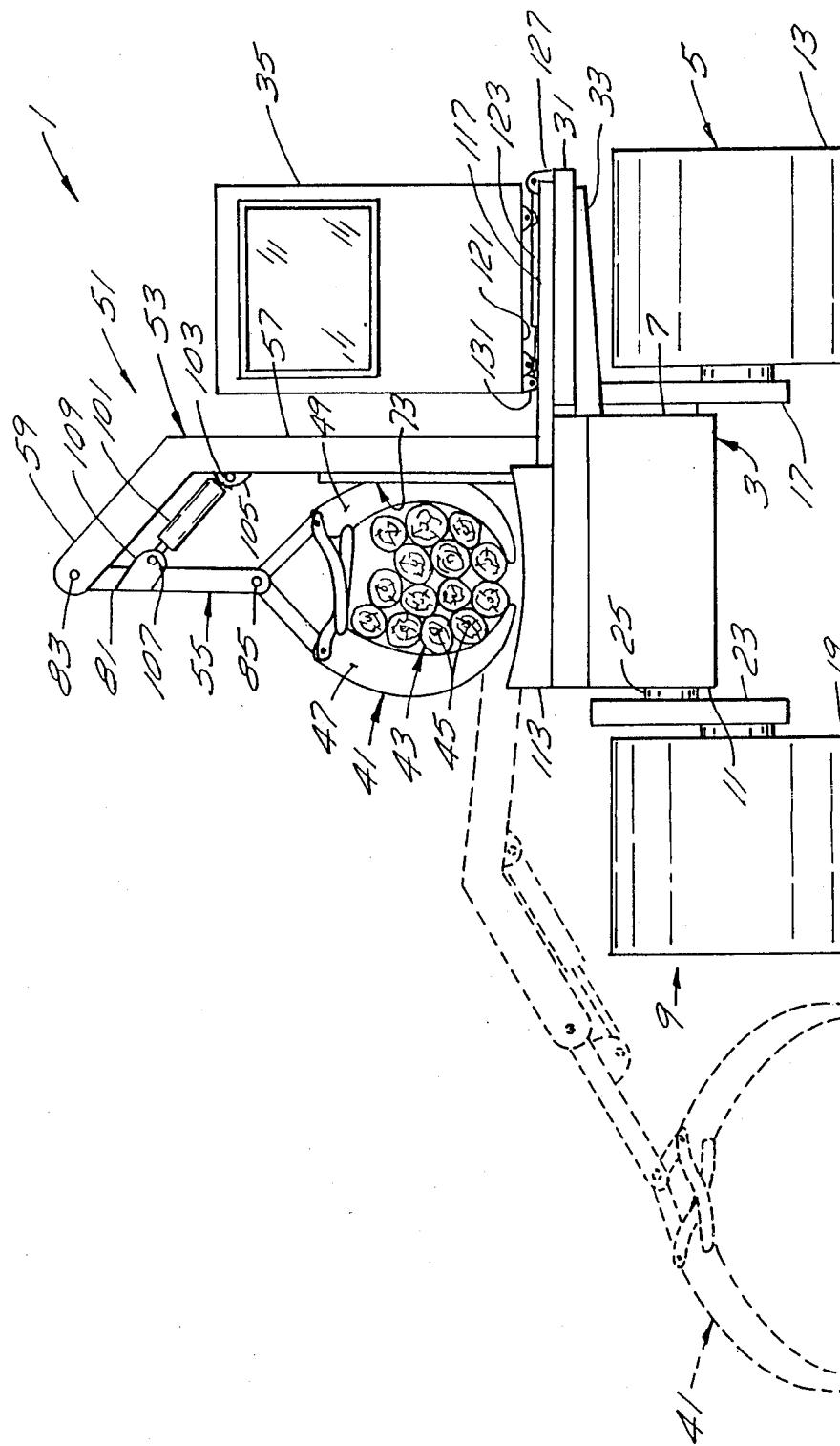
FIG. 1 is a front view of the vehicle.
Figure 2:
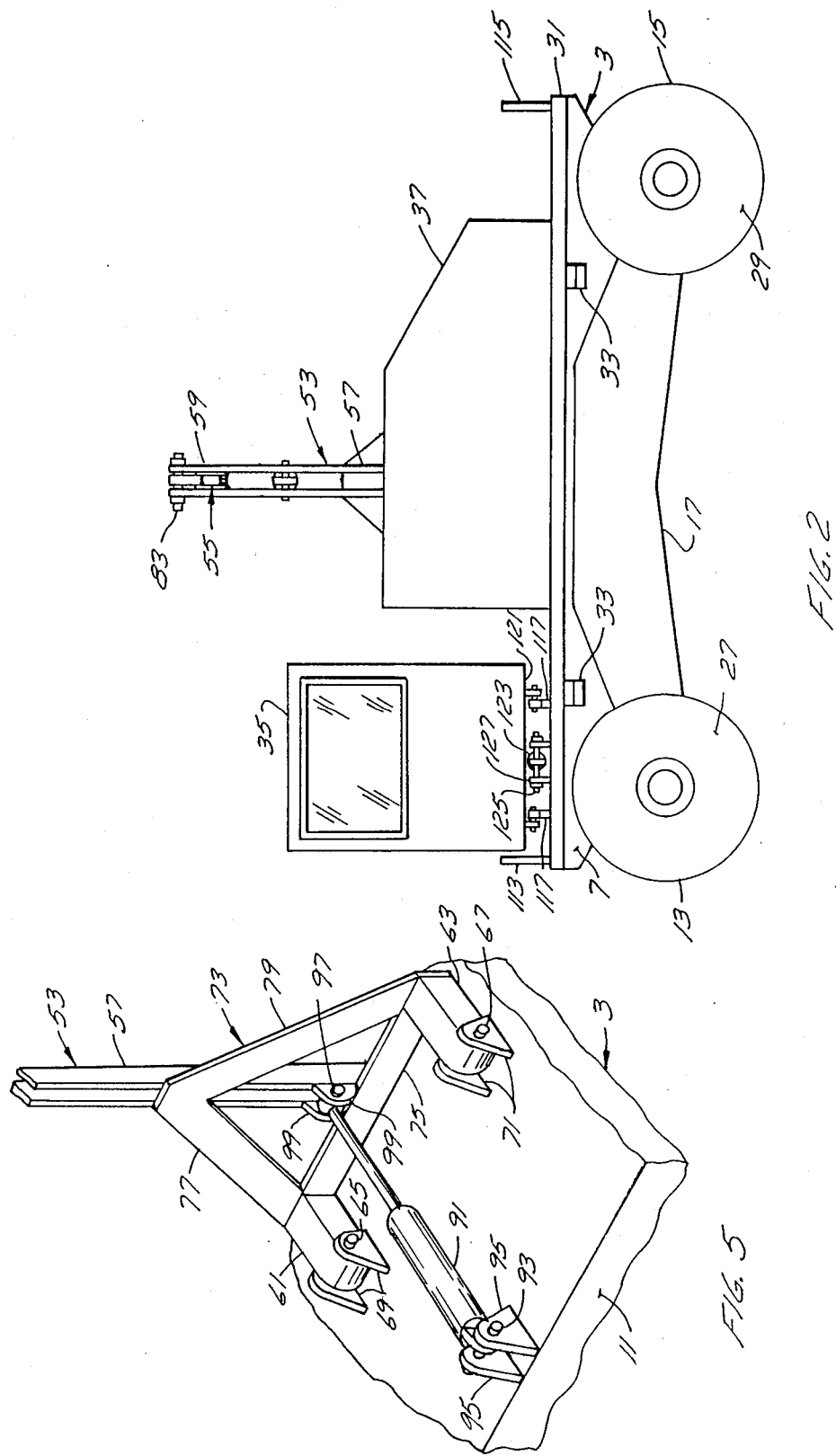
FIG. 2 is a right side view of the vehicle.
Figure 3:
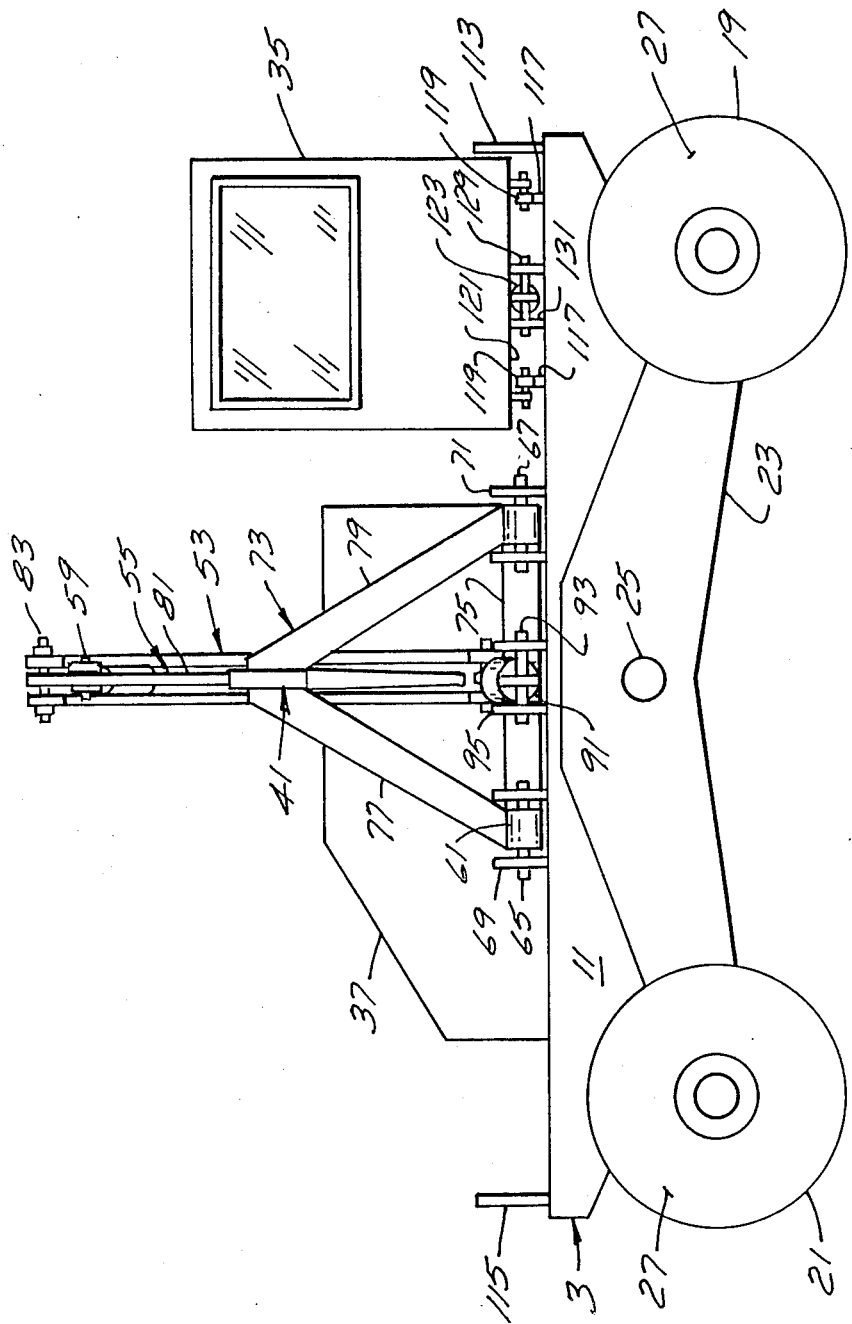
FIG. 3 is a left side view of the vehicle.
Figure 4:
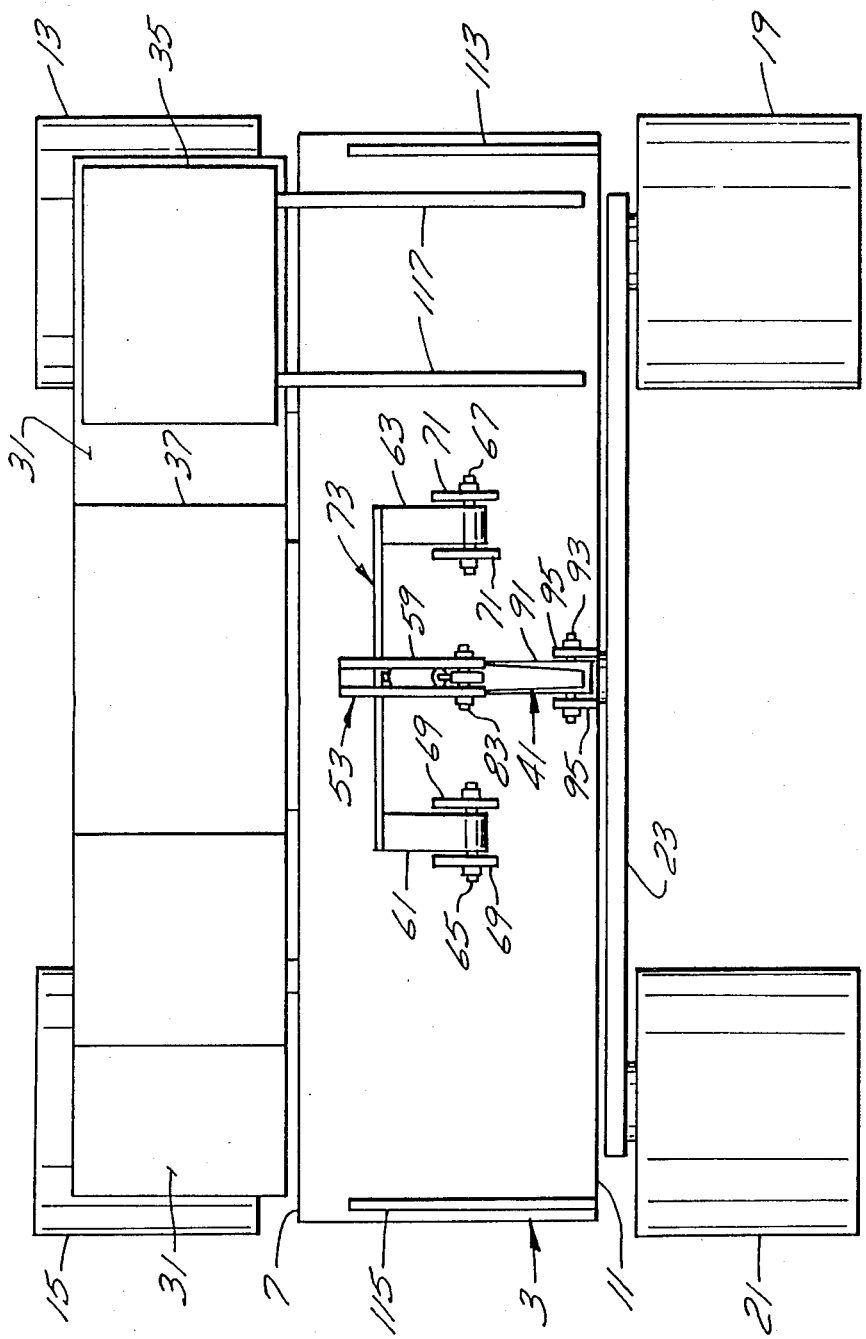
FIG. 4 is a top view of the vehicle.

The tree transporting vehicle 1, as shown in FIGS. 1 to 4, has a chassis 3. First ground engaging and drive means 5 are mounted on one side 7 of the chassis 3 and second ground engaging and drive means 9 are mounted on the other side 11 of the chassis. The first ground engaging and drive means 5 preferably comprise a pair of wheels 13, 15 mounted on the ends of a first support beam 17. The first support beam 17 is fixed intermediate its ends to the one side 7 of the chassis 3. The second ground engaging and drive means 9 also preferably comprise a pair of wheels 19, 21 mounted on the ends of a second support beam 23. This second support beam 23 is pivotally mounted at about its center by a pivot pin 25 to the other side 11 of the chassis. Each pair of wheels 13, 15 and 19, 21 is preferably driven with its own hydrostatic motor (not shown) so as to make the vehicle extremely manoeuverable. The wheels 13, 15 and 19, 21 are also provided with wide tires 27 to provide good traction and to reduce wheel loading so as to minimize wood breakage when the vehicle drives over trees.

A narrow platform 31 is mounted from the one side 7 of the chassis 3 by support arms 33. The platform 31 closely overlies the wheels 13, 15 on this side of the vehicle. The platform 31 extends longitudinally of the vehicle alongside the chassis 3 and carries an operator's station or cab 35 at its front portion and power supply means 37 for the vehicle at its rear portion. Because the wheels 13, 15 beneath the platform 31 are fixed, the platform 31 can be relatively low thus lowering the vehicle's center of gravity.

The vehicle 1 carries a grapple 41 for gripping and holding a bundle 43 of trees 45. The grapple 41 is of standard construction and has two oppositely curved jaws 47, 49 which are opened and closed by a fluid operator (not shown), so the grapple 41 can pick up and hold, or release, the bundle 43 of trees. Means 51 are provided for mounting the grapple 41 on the vehicle at about its longitudinal center. Means are also provided on the vehicle for moving the mounting means 51 for the grapple 41 transversely of the vehicle between a first tree loading position where the grapple 41 is located adjacent the ground alongside the other side of the chassis 3, and a second tree carrying position where the grapple 41 is located on top of, and adjacent to, the chassis 3 between wheels 13, 15 and wheels 19, 21.

The grapple mounting means 51 comprises at least a first rigid support member 53 shaped to at least partly receive the grapple 41 within the member when the mounting means 51 is in its second tree bundle carrying position. The mounting means 51 preferably includes a second rigid support member 55 connecting the grapple 41 to the first support member 53 in order to better position the grapple 41 with the mounting means 51 in its first tree loading position.

The first support member 53 has a main support section 57 with a support arm 59 cantilevered from one end of support section 57, and mounting legs 61, 63 extending transverse to the support section 57 at its other end. The mounting legs 61, 63 are parallel to each other, and spaced-apart, one on each side of the main section 57. The outer end of each leg 61, 63 is pivotally mounted on a pivot member 65, 67 respectively, each pivot member 65, 67 mounted between a pair of brackets 69, 71 respectively fixed to the chassis 3. The pivot members 65, 67 are axially aligned and located approximately over the longitudinal axis of the chassis. The space between the pivot members 65, 67 is also approximately bisected by the transverse axis of the vehicle. The mounting legs 61, 63 are connected at their other ends to a brace 73 which in turn is fixed to the main section 57 of support member 53. The brace 73 is formed by three legs 75, 77, 79 joined together at their ends to provide a triangular shaped brace. One brace leg 75 is joined to, and extends between, the ends of the mounting legs 61, 63. The center of this brace leg 75 is fixed to the other end of the main section 57 of support member 53. The other two brace legs 77, 79 extend from the ends of the mounting legs 61, 63 respectively to the main section 57 of the support member 53 intermediate its ends. The support member 53 is pivotally mounted on the chassis 3 via its mounting legs 61, 63 and pivot members 65, 67. The spaced-apart mounting legs 61, 63 and brace 73 strengthen the support member 53 against lateral loads.

The second support member 55 of the mounting means 51 can comprise a short, straight, rigid section 81 pivotally mounted at one end with a pivot member 83 to the free end of the support arm 59 on the first support member 53. The other end of the section 81 connects to the grapple 41 with a pivot member 85.

With the grapple mounting means 51 in its second position, the main support section 57 of the first support member 53 extends generally vertically. The grapple 41 is suspended adjacent the main section 57, by section 81 of the second support member 55, between the support arm 59 and mounting legs 61, 63, and thus partly within the first support member 53.

The means for moving the mounting means 51 to move the grapple 41 includes a first fluid operator 91 extending generally transverse to the longitudinal axis of the vehicle. One end of the operator 91 is attached via a pivot member 93 to brackets 95 on the chassis 3 near its other side 11 as shown in FIG. 5. The other end of the operator 91 is attached via a pivot member 97 to brackets 99 on the main support section 57 of the first support member 53. The brackets 99 are located near the other end of the section 57. The moving means includes a second fluid operator 101 attached at one end via a pivot member 103 to brackets 105 on the main support section 57 near its one end, as shown in FIG. 1. The other end of the fluid operator 101 is attached via a pivot member 107 to brackets 109 on the section 81 comprising the second support member 55 near its one end. Actuation of the two fluid operators 91, 101 will move the mounting means 51 between a tree loading position where the grapple 41 is positioned alongside the other side of the vehicle adjacent the ground, as shown by dotted lines in FIG. 1, and a tree carrying position over the chassis 3 as shown by solid lines in FIG. 1. It is contemplated that the mounting means 51 for the grapple 41 can comprise a single support member, suitably shaped with the grapple 41 mounted directly to its free end with a pivot member. In this case only a single fluid operator is needed to move the mounting means. It is preferable however to employ two pivotally connected support members 53, 55 as shown, to make up the mounting means 51, and two fluid operators 91, 101 to move the support members, as described above, to obtain better control over the grapple 41.

Bundle supports 113, 115 can be provided at the front and back of the chassis 3 to support the bundle 43 of trees on the chassis 3 just above the fluid operator 91. The tree bundle 43 is lowered slightly onto supports 113, 115 by operation of fluid operator 101. The tree bundle 43, while resting on the supports 113, 115, is still held by the grapple 41.

While the vehicle described works satisfactorily, it is a bit difficult for the operator to clearly see the trees to be picked up in a bundle since he is positioned on the one side of the chassis 3 while the trees are adjacent the other side. To give the operator a better view, the operator's cab 35 can be mounted on tracks 117, or other suitable guide means, which extend transversely across the platform 31 and the chassis 3 to the other side 11 of the chassis. Rollers 119, or other suitable support means, are mounted at the corners on the bottom 121 of the operator's cab 35 to ride on the tracks 117. Means are provided for moving the cab 35 along the tracks 117 between a first position over the platform 31, and a second position, over the chassis 3 adjacent its other side 11. The moving means can comprise a fluid operator 123 fixed at one end via a pivot 125 to brackets 127 mounted on the outer side of the platform 31. The other end of the operator 123 is fixed via a pivot 129 to brackets 131 mounted on the bottom 121 of the cab 35 at its inner side. Actuation of the operator 123 will move the operator's cab 35 between its first position over the platform 31 from where the operator normally drives the vehicle, and the second position over the chassis 3 from where the operator can get a better view for picking up a bundle of trees off the ground with the grapple 41. If desired, the movement of the operator's cab could be undertaken with moving means controlled by the movement of the grapple mounting means 51. As the mounting means 51 moves between its first and second positions, a suitable cable and pulley system, connected between the grapple mounting means 51 and the operator's cab 35, would simultaneously move the cab between its first and second positions.

While the vehicle has been described for use in transporting trees, it is to be understood that the vehicle can be used to transport other elongated goods such as poles or pipes, which can be loaded with the grapple 41.

The vehicle could also be used to transport any type of goods without the grapple 41. The grapple 41 could be removed and goods could be loaded on the vehicle with other loading means. The vehicle can then carry these goods over rough terrain due to its unique wheel mounting arrangement with the wheels on the operator's side fixed to the chassis and the wheels on the other side bogie mounted. The special wheel mounting arrangement allows the offset cab and power supply means to be located as close as possible to the ground thus making the vehicle quite stable. The bogie wheel mounting on the other side of the vehicle permits the vehicle to traverse rough terrain. The operator would steer the vehicle to have the fixed wheels avoid the severest obstacles.

The power supply means 37 on the platform 31 provides the power to drive the vehicle, through hydrostatic motors driving the wheel pairs for example, and to operate the grapple and the fluid operators 91, 101 and 123 if used. The fluid operators preferably comprise hydraulic cylinders.

I claim:

1. A vehicle with four rotatable ground engaging means comprising: a single, rigid chassis mounting a power unit, drive means and material handling and/or carrying means, the chassis having a longitudinal axis; a first two of the ground engaging means rigidly mounted on one side of the chassis at longitudinally spaced-apart locations, the axis of rotation of the first two ground engaging means located in a horizontal plane extending parallel to the longitudinal axis of the rigid chassis; the other two ground engaging means located on the other side of the chassis, a beam carrying the other two ground engaging means, one at each end of the beam, and means pivotally mounting the beam, intermediate its ends, to the other side of the chassis.

2. A vehicle as claimed in claim 1 wherein each ground engaging means comprises at least one wheel.

3. A vehicle as claimed in claim 2 including an operator's cab mounted on the chassis.

4. A vehicle as claimed in claim 3 wherein the power unit and the operator's cab are mounted on the chassis over the first two of the wheels.

5. A vehicle as claimed in claim 2 including a hydrostatic motor for driving each pair of wheels on each side of the chassis.

6. A vehicle as claimed in claim 1 wherein the first two ground engaging means are rotatably mounted on the ends of a second beam, the second beam being fixed to the one side of the chassis.

7. A vehicle as claimed in claim 1 including an operator's cab mounted on the chassis.

8. A vehicle as claimed in claim 7 wherein the power unit and the operator's cab are mounted on the chassis over the first two of the ground engaging means.

* * * * *